Feb. 3, 1942.   G. W. ASHLOCK. JR   2,271,675
OLIVE PITTER
Filed Nov. 26, 1940   3 Sheets-Sheet 2
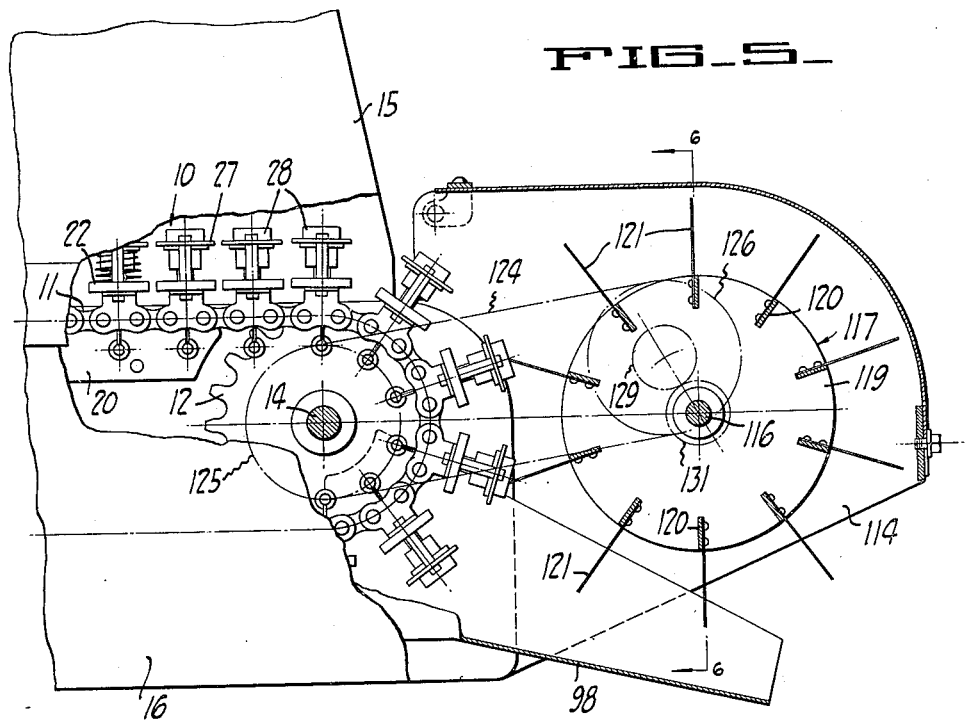
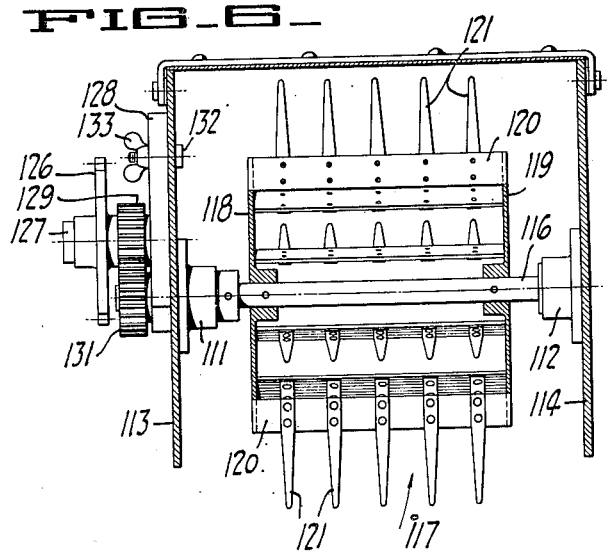
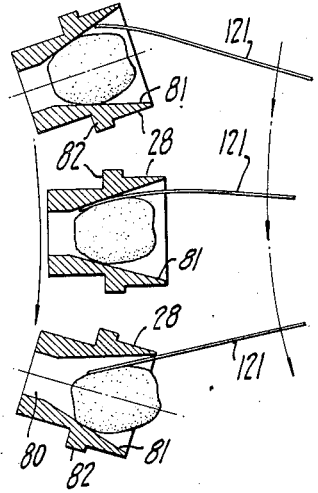
INVENTOR
George W. Ashlock Jr.
BY Robert N. Eckhoff
ATTORNEY Feb. 3, 1942.  G. W. ASHLOCK, JR  2,271,675
OLIVE PITTER
Filed Nov. 26, 1940  3 Sheets-Sheet 3
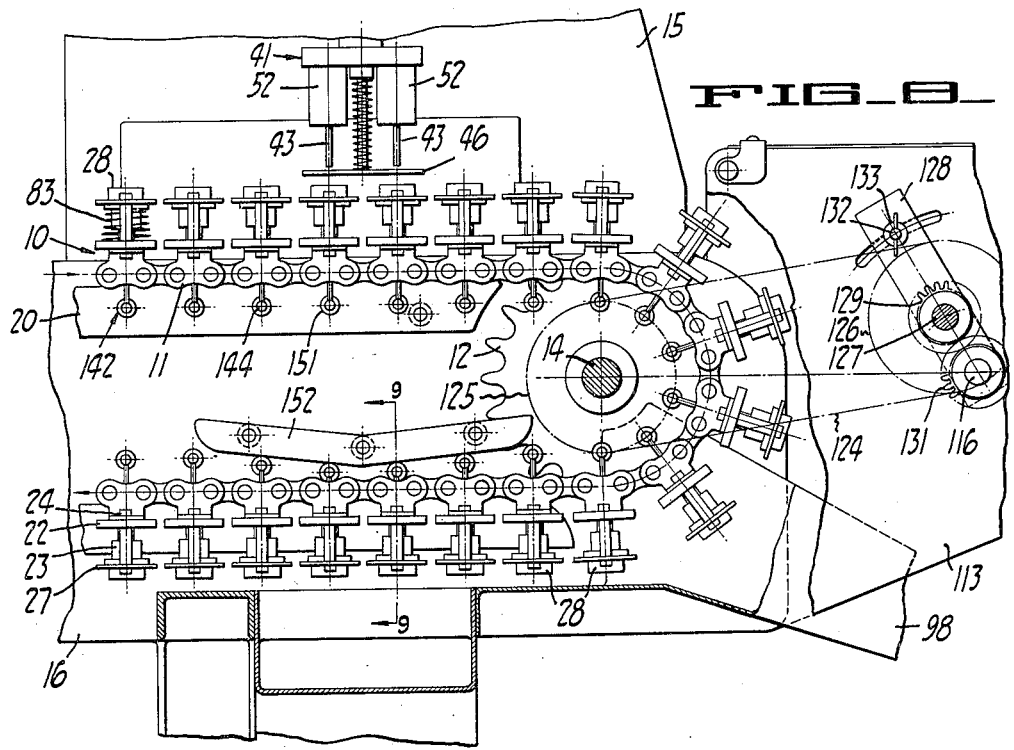
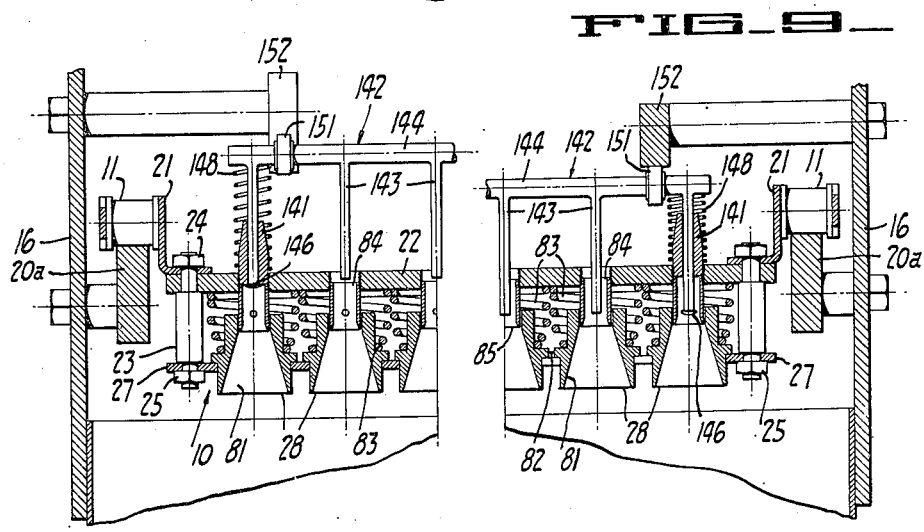
INVENTOR
George W. Ashlock Jr.
BY Robert H. Eckhoff
ATTORNEY Patented Feb. 3, 1942

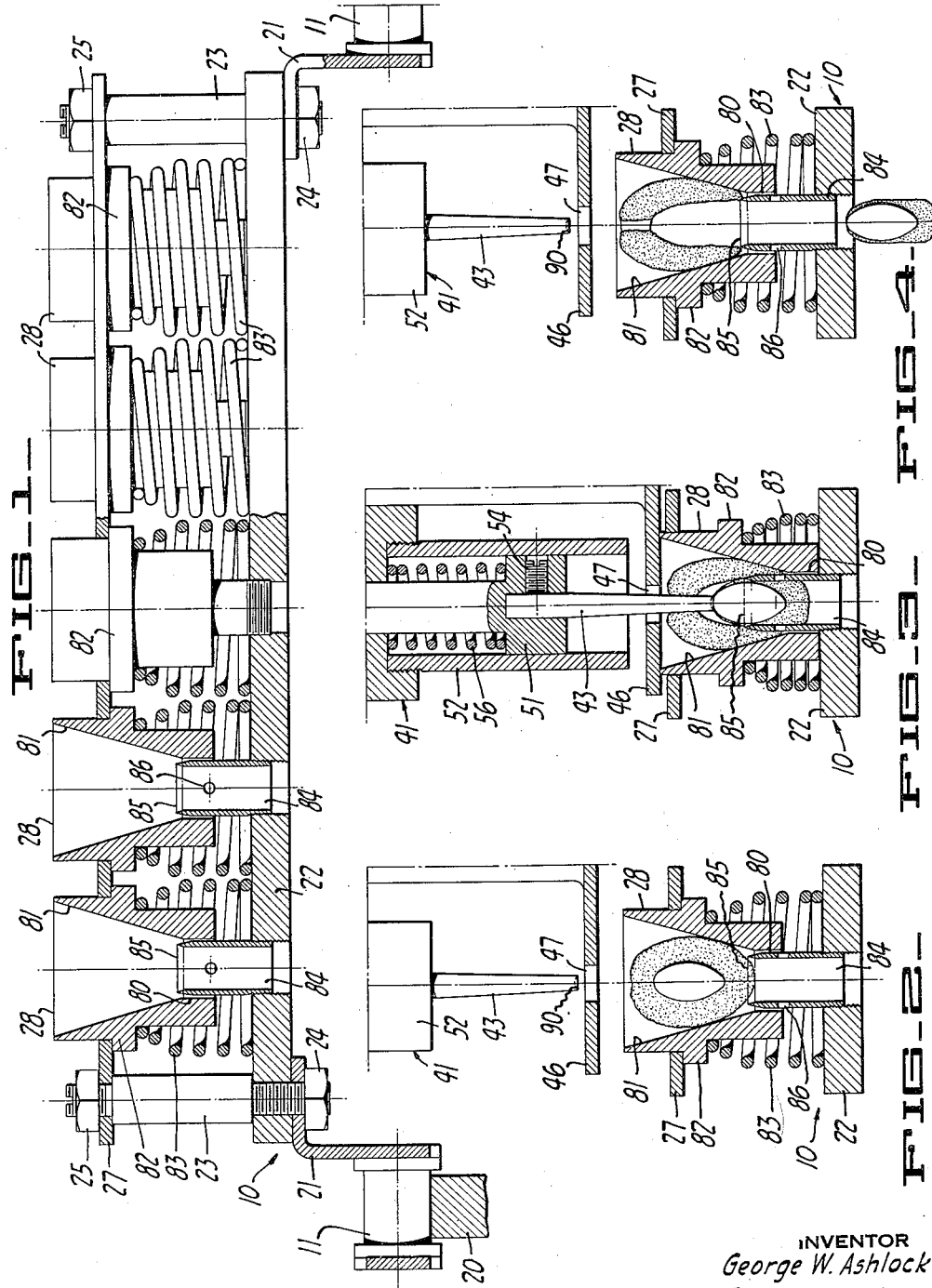

2,271,675

UNITED STATES PATENT OFFICE 2,271,675

OLIVE PITTER

George W. Ashlock, Jr., Oakland, Calif.

Application November 26, 1940, Serial No. 367,164

15 Claims. (Cl. 146—27)

This invention relates to fruit pitting machines particularly those adapted for the pitting of drupaceous fruits such as olives, plums and the like. The machine of the present invention has proven particularly useful upon olives and it will therefore be described in this connection. However, it is to be understood that the machine may be employed on other like fruit.

Previous pitting machines adapted for the handling of olives have been characterized by a relative slowness in operation whereby the capacity of each machine was relatively limited and a large number of machines was required to secure a large output of pitted fruits. Previous olive machines have also been characterized by an inability to pit properly any relatively large percentage of a given volume of the fruit due to variations in the size of the fruit, the size of the pit and the relation of the pit to the meat or flesh of the fruit. That this problem is a difficult one will be appreciated when it is remembered that an olive is relatively oval in shape and that, therefore, it does not lend itself readily to handling, tending to turn or deflect when a pitting knife is jammed into it suddenly. This is further understandable when it is recalled that an olive is relatively tough while the pit is hard, also nearly oval in shape. Because of these difficulties the prior art has even given considerable attention to the inclusion of segregating means for removal of unpitted fruit and testing means for determining whether or not a pitting operation was even effected upon the fruit.

The machine of the present invention is relatively simple and rugged. Further, it is very rapid in operation, at the same time being reliable in its operation so that the amount of unpitted fruit is negligible. In this connection, the machine of the present invention involves a unique receptacle for the fruit to be pitted. This receptacle is so formed that maintenance of the fruit in proper alignment during pitting or coring is a relatively easy matter, the receptacle maintaining the alignment of the fruit particularly during the pitting operation. This has an advantage in that it reduces to a minimum the quantity of unpitted or improperly pitted olives. As a matter of fact, the machine is so reliable in operation that the only olives which are not pitted are usually those containing an over-sized pit and which should have been rejected as culls.

The positioning of olives with their longest axis in a vertical position is a relatively difficult matter and heretofore the problem has usually been attacked by handling the olives with their longitudinal axis extending horizontally, it being much easier to place the olives in this position. This possesses certain disadvantages, particularly in that operation of a machine is usually restricted to a single row, thus making the operation a relatively slow one. In accordance with this invention the olives are handled with their longitudinal axis vertically, it thus being possible to handle a plurality of rows of olives at the same time and thus secure a multiple operation.

In some instances it will be found that the pitting operation conducted upon the olive has been so vigorous as to jam the olive into the receptacle in which it is carried. In accordance with this invention a simple and yet positive release means is provided to force out of any receptacle a pitted olive jammed therein, the release means cooperating with the receptacle and quickly, accurately and positively forcing the olive therefrom.

The machine of the present invention is effective to pit all except cull olives containing pits which are very much over-size. In some instances it will be found that the pits are retained in the tubular coring knives employed and to avoid this means are provided for freeing each tubular knife of any olive pit jammed therein.

In general the broad object of the present invention is to provide a simple, rugged, fast and reliable fruit pitting machine particularly adapted for use on olives and the like. The invention includes other objects and features of advantage some of which, together with the foregoing, will appear in the following description of the present preferred embodiment of the machine of my invention. It will be understood that the form disclosed is only that presently preferred and various others can be adapted within the scope of the appended claims.

Referring to the drawings,

Figure 1 is a side elevation, partly in section of an olive carrier receptacle employed in the machine of the present invention.

Figures 2, 3 and 4 are sectional views illustrating the mode of operation of the article receptacle and the manner in which it cooperates with the pitting plunger and the tubular coring knife.

Figure 5 is a side elevation partly in section showing mechanism for releasing an olive jammed in one of the receptacles.

Figure 6 is an end view partly in section through the releasing means showing its drive.

Figure 7 is a diagrammatic view illustrating the mode of operation of the cored olive release means.

Figure 8 is a side view partly in section showing the pit releasing mechanism in its relation to the general organization.

Figure 9 is a section taken along the line 9—9 of Figure 8.

Figure 10 is a view generally similar to Figure 9 but showing the pit removing mechanism in a different position, the view being taken on the opposite side of the machine.

In my previous patents, 2,157,518 of May 9, 1939, and 2,219,832 of October 29, 1940, are disclosed pitting machines wherein an endless fruit carrier 10 is moved continuously toward a pitting head structure. In the present instance, as in the patented structures, the machine includes opposite chains 11 movable about sprockets 12 on shaft 14 and carried upon suitable rails 20 supporting an upper horizontal run of the conveyor as it advances toward a pitting head mounted between vertically extending side plates 15 on frame 16.

The fruit carrier structure is modified in accordance with the present invention to include a base plate 22. Studs 23 and nuts 24 secure the base plate to the opposite angles 21 on each chain 11. At the other end of the stud is secured a top plate 27 held in place by a nut 25 on the end of the stud. Slidably mounted on each top plate is a plurality of article carrier receptacles 28. Each receptacle includes a flange 82 thereon engaging the top plate against which the receptacle is urged by a suitable spring 83.

Each receptacle includes a cavital portion 81 therein to receive an article. In accordance with this invention the wall defining the cavital opening is conical, the cavity being, in effect, the frustum of a cone. The cavital wall is so formed that substantially everywhere opposite points on the wall are at an angle between 32° and 44°, the preferred angle being about 36° and with large olives about 38°. This angle is relatively critical and while some variation can be made therein, those values given, namely 32° and 44°, generally represent the maximum permissible variation. As the angle is either opened up to approach a straight line or is narrowed until the walls are substantially parallel, the tendency for an oval shaped article therein to stick to one side or the other increases very rapidly. When the walls of the cavital opening have an included angle between the values given, an oval shaped article such as an olive can be aligned accurately and maintained in this alignment, that is, with the major axis of the olive coincident with the major cavital axis, as appears in Figures 2, 3 and 4 in the drawings, during all stages of the pitting operation.

Adjacent the bottom of the receptacle, that is at the small end of the cone frustum, is a generally cylindrical portion 88 through which extends a tubular knife 84 screwed into an opening in the base plate 22. Cutting edge 85 on the knife is positioned adjacent the bottom of the conical portion.

During operation of the pitting machine of the present invention the conveyor chains 11 are advanced continuously. The pitting head structure generally indicated at 41 is moved to and fro over the run of the conveyor at such a rate that a cutting knife or plunger 43 carried thereby moves down to engage the fruit in the carrier and force the pit therein out after the fruit has first been cored by the tubular knife. To secure the proper movement of the pitting head one can employ the construction disclosed in either one of my aforementioned patents or any other suitable construction whereby the pitting plunger 43 is suitably presented and engages the fruit while the fruit is continuously advanced.

If desired, the fruit carrier can be advanced in steps with a period of rest between each step. During the rest period the pitting operation is conducted. Operation in this way is usually slower and, therefore, generally less desirable.

As appears in Figures 2, 3 and 4, lowering of the pitting head 41 brings knife stripper plate 46 into position above the article receptacle 28. Thereafter the pitting knife or plunger 43 advances through aperture 47 in the stripper plate to engage the fruit. The end of the knife or plunger is preferably made with a recess as at 90 to engage and fit over the end of the olive pit.

With tough, firm fruits such as an olive the first action is to force the fruit down onto the tubular knife, the receptacle 28 moving downwardly in its supporting plate 27 and compressing spring 83. This positive lowering of the fruit results in the tubular knife cutting a core from the fruit. The plunger then continues on into the fruit and forces the cored portion and the pit down into and through the tubular knife through which it is ejected. To prevent a cylinder and piston action between the cored pit portion and the tubular knife I preferably include in the tubular knife several holes indicated at 86 so that air is admitted to permit easy release of the pit. As the plunger continues to its original position it moves through the aperture in the stripper plate and any flesh of the fruit carried thereon is removed by the stripper plate.

In the vast majority of cases the fruit is held in accurate alignment by the cavital wall 81 formed at the relatively critical angle as discussed above. However, in a few instances, particularly with misshapen fruit it is possible for the pit to be off center with respect to the exterior of the fruit. In this instance I have sometimes observed that the plunger forces the pit directly against the tubular knife which results in either the plunger or the tubular knife being broken or otherwise damaged. In accordance with this invention I mount the plunger or pitting knife 43 in a suitable sliding head 51 carried in a support structure 52 on the pitting head 41, set screw 54 serving to retain the plunger or knife in position. A stiff spring 56 between the plunger support member 51 and the pitting head assures that the plunger is only permitted to move when it has engaged a relatively immovable object such as will occur when the pit is jammed between the plunger and the tubular knife.

In some instances the pitting operation is effective to jam the olive into the cavital opening 81 and force a portion of the olive between the cavital opening and the tubular knife whereby the olive is retained. To ensure the release of each cored olive I preferably provide means cooperating with the cavital opening 81 to release and remove an olive. Referring particularly to Figures 5, 6 and 8, I preferably mount journals 111 and 112 on plates 113 and 114, these plates being mounted on opposite sides of the frame 16 and continuing the frame. In the journals I mount a shaft 116. A wheel structure generally indicated at 117, including opposite annular discs 118 and 119 joined by transverse members 120, is keyed to the shaft 116. Mounted upon each transverse member 120 and extending outwardly therefrom are a plurality of spring steel fingers 121. Shaft 116 is so positioned with respect to shaft 14 that the path of travel of the fingers overlaps a portion of the path of travel of the conveyor 10 about sprockets 12. As a matter of fact, as appears in Figure 7, each steel finger extends into a cooperatively placed receptacle, sliding along the cavital opening therein and entering between each olive and the side of the cavity to finally eject the olive as appears in the lower portion of Figure 7, as the sprockets 12 and the wheel 117 rotate in a properly timed relationship.

To provide for the rotation of wheels 117 in time with conveyor 10, chain 124 is passed about sprocket 125 on shaft 14 and about another sprocket 126 on an idler shaft 127. The idler shaft 127 is mounted upon a lever 128 which is supported upon shaft 116. A gear 129 is secured to sprocket 126 and is normally enmeshed with the gear 131 keyed to shaft 116. A suitable bolt 132 and a wing nut 133 enable the position of lever 128 to be adjusted whereby the proper tension is maintained on the chain.

In operation, wheel 117 rotates in a direction opposite to the direction of rotation of sprockets 12; that is, sprocket 12 in Figure 5 rotates in a clockwise direction and wheel 117 in a counterclockwise direction. This results in each of the several fingers being successively positioned in a cavital opening, to slide along the inner face of the cavital opening and enter between the pitted olive and the side wall of the cavity to release the olive and force it out to the receiving tray 98.

While I have heretofore disclosed a machine in which plungers 43 operated to eject through the tubular knives 84 each pit as it was cored and forced out of an olive, in some instances it may be found desirable to restrict the length of travel of the plunger 43 and permit the olive pit and the cored portion to remain in the tubular knife 84. In this instance I provide a core and pit ejecting means. This is accomplished by screwing into plate 22 at each end thereof a suitable guide plug 141, there being two of these, one at each end of the plate. A supplementary plunger structure indicated generally at 142 is supported in these guideways. The supplementary plunger structure includes a plurality of separate plungers 143, there being one for each tubular knife and cavital opening. Each of the plungers is supported from a suitable base as a rod 144. Those plungers which extend through the guides 141 are flanged over as at 146 so that they cannot slide out. The plungers are normally maintained in a position whereat they do not interfere with the pitting or coring operation, this being attained through the use of springs 148 which bear against the rod 144 and force the supplementary plunger structure away from the base. Each rod 144 carries suitable rollers 151 which ride along and engage shoe cams 152 positioned on opposite sides of the machine while the conveyor is supported by rails 20a. These cams are effective to force the plungers downwardly into an ejecting position, as in Figure 9 from a release position such as that in which the supplementary plungers appear in Figure 10. Normally the length of the shoe cam is about two feet although it can be made more or less as desired. By employing the supplementary plunger structure, the entire series of tubular knives and cavital openings can be cleared of any pits, cores or olives jammed therein so that as the conveyor 10 moves to its point of return, it can be completely reloaded with olives. The reloading operation is described, particularly with respect to the loading of olives therein and the straightening thereof in my copending application filed on even date thereof and entitled Olive straightening device.

The machine of the present invention is particularly characterized in that it operates continuously whereas prior art machines have generally operated on the step by step basis. This continuous operation has the advantage that few, if any, parts are subject to reciprocating motion and, therefore, this machine can operate much faster with less wear and tear. By operating the machine so it removes the pitted and cored olives prior to removal of the pits and by retaining the pits by such a mechanism as a tubular knife, I am assured of accurate separation of the two. The presence of a few cull olives or unpitted olives among the cored olives is not objectionable inasmuch as the packing of the cored olives is a hand operation and the olives are, therefore, subject to inspection prior to filling and the few culls may, of course, be readily removed. Since a full core is actually cut from the olive and since the core is removed separately without damage to the olive, a firm product is assured.

I claim:

1. A pitting machine of the character described comprising a succession of carriers arranged as a substantially endless belt and movable over a path including a pitting station, each carrier including a receptacle having an opening in the bottom of the article supporting cavity provided by said receptacles, a tubular knife, means positioning said knife adjacent said receptacle opening, means for moving said knife relative to said receptacle adjacent to said pitting station to cut an article in said receptacle, a plunger at said pitting station, and means for moving said plunger to enter said cavity toward said tubular knife and force a core into said knife.

2. A pitting machine of the character described comprising a succession of carriers arranged as a substantially endless belt and movable at a substantially constant rate of advance over a path including a pitting station, each carrier including a receptacle having an opening in the bottom of the article supporting cavity provided by said receptacle, a tubular knife, means positioning said knife adjacent said receptacle opening, means for moving said knife relative to said receptacle adjacent to said pitting station to cut an article in said receptacle, a plunger at said pitting station movable to enter said cavity toward said tubular knife and force a core into said knife, support means for said plunger, means for moving said support means to and fro over a path overlying the path of said belt, and means for moving said plunger to engage an article on said belt during movement of said support means in the direction of advance of said belt.

3. A pitting machine of the character described comprising a succession of carriers arranged as a substantially endless belt and movable at a substantially constant rate of advance over a path including a pitting station, each carrier including a receptacle having an opening in the bottom of the article supporting cavity provided by said receptacle, a tubular knife, means positioning said knife adjacent said receptacle opening, means for moving said knife relative to said receptacle adjacent to said pitting station to cut an article in said receptacle, a plunger at said pitting station movable to enter said cavity toward said tubular knife and force a core into said knife, support means for said plunger, means for moving said support means to and fro over a path overlying the path of said belt and converging therewith, and means for moving said plunger to engage an article on said belt during movement of said support means toward said belt and in the direction of advance of said belt.

4. In a device of the character described, a first wheel, a conveyor including a receptacle carrying an article therein over an arcuate path including a portion wherein said conveyor passes about said first wheel, a second wheel rotating adjacent said first wheel at substantially the same rate and in the opposite direction, and a finger on said second wheel extending therefrom to enter, engage and wipe at least one face of said receptacle during said rotation.

5. In a device of the character described, a first wheel, a conveyor including a plurality of receptacles each carrying an article therein over an arcuate path including a portion wherein said conveyor passes about said first wheel, a second wheel rotating adjacent said first wheel at substantially the same rate and in the opposite direction, and a plurality of fingers on said second wheel, each extending from said second wheel to enter, engage and wipe at least one face of a cooperatively positioned receptacle during said rotation.

6. In a device of the character described, a first wheel, a conveyor including a receptacle carrying an article therein over an arcuate path including a portion wherein said conveyor passes about said first wheel, said receptacle having a cavity therein the side walls of which are substantially everywhere at an angle of from 32° to 44° to each other, a second wheel rotating adjacent said first wheel at substantially the same rate and in the opposite direction and a finger on said second wheel extending therefrom to enter, engage and wipe at least the side wall of the receptacle cavity during said rotation.

7. In a device of the character described, an endless conveyor movable over a path and having a plurality of receptacles therein, each receptacle having an article supporting cavity therein open at the bottom thereof, a tubular knife positioned cooperatively adjacent said opening, means urging said receptacle and said knife apart, means for moving said conveyor over a path, pitting means at one point in said path effective to force said knife and said receptacle together and to force an article in a receptacle onto said knife to cut a core therefrom and force said core into said knife, and article ejecting means positioned cooperatively adjacent said conveyor at a point in its path following the pitting means, said article ejecting means being effective to loosen an article jammed into said receptacle and including a finger movable into said receptacle to engage one side thereof and force an article away from said side.

8. In a device of the character described, an endless conveyor movable over a path including an upper run and a lower run and having a plurality of receptacles therein, each receptacle having an article supporting cavity therein open at the bottom thereof, a tubular knife positioned cooperatively adjacent said opening, means urging said receptacle and said knife apart, means for moving said conveyor over a path, pitting means at one point in the upper run of said path effective to force said knife and said receptacle together and to force an article in a receptacle onto said knife to cut a core therefrom and force said core into said knife, and article ejecting means positioned cooperatively adjacent said conveyor at a point in its path following the pitting means whereat the conveyor moves from the upper run to the lower run over a wheel, said article ejecting means being effective to loosen an article jammed into said receptacle and including a wheel movable with said conveyor and having thereon a finger movable into said receptacle to engage one side thereof and force an article away from said side.

9. In a device of the character described, an endless conveyor movable over a path and having a plurality of receptacles therein, each receptacle having an article supporting cavity therein open at the bottom thereof, a tubular knife positioned cooperatively adjacent said opening, means urging said receptacle and said knife apart, means for moving said conveyor over a path, pitting means at one point in said path effective to force said knife and said receptacle together and to force an article in a receptacle onto said knife to cut a core therefrom and force said core into said knife, article ejecting means positioned cooperatively adjacent said conveyor at a point in its path following the pitting means, said article ejecting means being effective to loosen an article jammed into said receptacle and including a finger movable into said receptacle to engage one side thereof and force an article away from said side, a plunger positioned cooperatively adjacent the bottom of said knife, and movable into said receptacle toward said knife, and means for moving said plunger at a point in the conveyor path beyond said pitting and said ejecting means.

10. In a device of the character described, an endless conveyor movable over a path including an upper run and a lower run and having a plurality of receptacles therein, each receptacle having an article supporting cavity therein open at the bottom thereof, a tubular knife positioned cooperatively adjacent said opening, means urging said receptacle and said knife apart, means for moving said conveyor over a path, pitting means at one point in the upper run of said path effective to force said knife and said receptacle together and to force an article in a receptacle onto said knife to cut a core therefrom and force said core into said knife, article ejecting means positioned cooperatively adjacent said conveyor at a point in its path following the pitting means whereat the conveyor moves from the upper run to the lower run over a wheel, said article ejecting means being effective to loosen an article jammed into said receptacle and including a wheel movable with said conveyor and having thereon a finger movable into said receptacle to engage one side thereof and force an article away from said side, a plunger positioned cooperatively adjacent the bottom of said knife and movable into said receptacle toward said knife, and means for moving said plunger at a point in the conveyor path beyond said pitting and said ejecting means.

11. In a device of the character described, a receptacle having an article supporting cavity therein open at the bottom thereof, a tubular knife positioned adjacent said opening, a pitting plunger movable through said cavity and into said tubular knife, means for moving said knife into said cavity toward the plunger, means for moving said pitting plunger through said cavity and into said knife, means for loosening and removing an article retained in said cavity following movement of said pitting plunger through said cavity, and a knife clearing plunger movable into said cavity and toward said knife after removal of an article in said cavity.

12. In a device of the character described, a receptacle having an opening in its bottom portion and having its interior flaring outwardly away from said opening substantially in the form of an inverted frustum of a cone with a vertical axis and with opposite sides thereof at an angle of substantially 36° to each other in that region whereat an oval shaped article can be engaged and supported by said receptacle whereby said oval shaped article is aligned within said receptacle with its longitudinal axis substantially coaxial with that of said receptacle, a tubular knife positioned adjacent said opening of said receptacle and relatively movable with respect to and thru said opening to engage and cut said oval shaped article therein, and means for retaining said oval shaped article in place in said receptacle during the cutting operation.

13. In a device of the character described, a receptacle having an opening in its bottom portion and having its interior flaring outwardly away from said opening substantially in the form of an inverted frustum of a cone with a vertical axis and with opposite sides thereof at an angle of approximately 32°-44° to each other in that region whereat an oval shaped article can be engaged and supported by said receptacle whereby said oval shaped article is aligned within said receptacle with its longitudinal axis substantially coaxial with that of said receptacle, tubular knife positioned adjacent said opening of said receptacle and relatively movable with respect to and thru said opening to engage and cut said oval shaped article therein, and means for retaining said oval shaped article in place in said receptacle during the cutting operation.

14. In a device of the character described, a receptacle having an opening in its bottom portion and having its interior flaring outwardly away from said opening substantially in the form of an inverted frustum of a cone with a vertical axis and with opposite sides thereof at an angle of approximately 32°-44° to each other in that region whereat an oval shaped article can be engaged and supported by said receptacle whereby said oval shaped article is aligned within said receptacle with its longitudinal axis substantially coaxial with that of said receptacle, a tubular knife positioned adjacent said opening of said receptacle and relatively movable with respect to and thru said opening to engage and cut said oval shaped article therein, means for retaining said oval shaped article in place in said receptacle during the cutting operation, and a pitting plunger movable through said receptacle toward said tubular knife.

15. In a device of the character described, a receptacle having an opening in its bottom portion and having its interior flaring outwardly away from said opening substantially in the form of an inverted frustum of a cone with a vertical axis, whereby an article to be treated is aligned within said receptacle with its longitudinal axis substantially coaxial with that of said receptacle, a tubular knife positioned adjacent said opening of said receptacle and relatively movable with respect to and thru said opening to engage and cut said article, and means for retaining said article in place in said receptacle during the cutting operation.

GEORGE W. ASHLOCK, JR.